May 3, 1960 B. L. MILLS 2,935,169
DISENGAGING SPRING MEANS FOR FLUID CLUTCHES
Filed June 19, 1958 2 Sheets-Sheet 1

INVENTOR.
BURTON L. MILLS
BY J. P. Wiessler
ATTY.

May 3, 1960            B. L. MILLS            2,935,169
DISENGAGING SPRING MEANS FOR FLUID CLUTCHES
Filed June 19, 1958            2 Sheets-Sheet 2
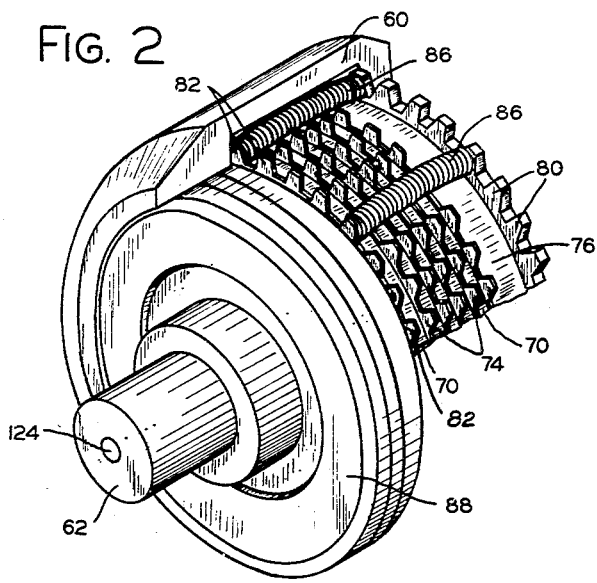
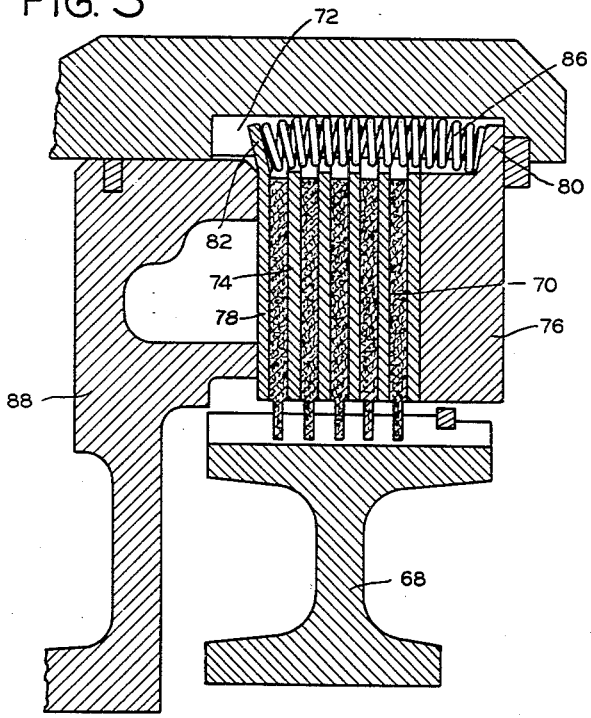
INVENTOR.
BURTON L. MILLS
ATTY.

United States Patent Office 2,935,169
Patented May 3, 1960

2,935,169

DISENGAGING SPRING MEANS FOR FLUID CLUTCHES

Burton L. Mills, Buchanan, Mich., assignor to Clark Equipment Company, a corporation of Michigan Application June 19, 1958, Serial No. 743,190

3 Claims. (Cl. 192—85)

This invention relates to friction devices and more particularly to disk clutches or brakes which utilize one or more resilient disconnect means adjacent the outer peripheries of the disks.

The use of such clutches, for example, with change-speed transmissions for vehicles has been generally satisfactory. However, it has been found in certain applications, particularly those in which the transmission is frequently operated to change the direction of motion of the vehicle or wherein frequent stopping and starting of the vehicle is necessary, that previous disk-type disconnect clutches which utilize peripherally located return springs sometimes cause trouble. Such trouble usually results from a tendency of the springs to "hang-up" on the peripheral portions of the disks so that disengagement of the clutch is made difficult or impossible without disassembly thereof. In applications of the types above noted failure of the clutch to fully disengage promptly upon demand causes much inconvenience and difficulty in operation.

The present invention contemplates a novel construction in such clutches which includes the use of peripheral tooth portions of the clutch end plates which taper outwardly in both axial and circumferential directions to effect an arching of the return springs, the opposite ends of which are in abutment with such tooth portions, thereby effecting adequate clearance between each spring and the various clutch plates and eliminating the possibility of entanglement therebetween. Another problem which often arises in the use of prior constructions is that insufficient radial clearance between the return springs and clutch plates permits peripheral portions of the clutch plates to contact and rub on the spring during operation, thereby causing undue wear and premature spring failure.

Most importantly, the present invention assures essentially equal separation of the clutch plates of the transmission which have heretofore tended to drag, resulting in rotation of the output shaft and consequent clashing of the gear teeth when shifting of the gears is attempted. This condition has been found to be most serious when a shifting operation from neutral position to either forward or reverse drive is attempted.

It is therefore a primary object of the present invention to provide a construction for disk clutches or brakes wherein peripherally located return springs are mounted so as to insure adequate clearance between the disks and springs.

It is another important object of the present invention to provide in a power transmission a construction for disk clutches wherein peripherally located return springs are mounted so as to insure essentially equal separation of the clutch plates when the clutch is disengaged.

A further object of the present invention is to provide in clutches or brakes of the type specified an arched return spring construction.

Another object hereof is to provide in clutches or brakes of the type specified a return spring construction which when combined with the clutch plates in accordance with this invention are not subject to entanglement or contact with the rotating disks.

Additional objects and advantages of this invention will become apparent from the following description and accompanying drawing, wherein:

Figure 2 is an enlarged partial view in perspective of the multiple disk clutch shown in Figure 1; and Figure 3 is an enlarged partial side view in section of Figure 2.

Figure 1:
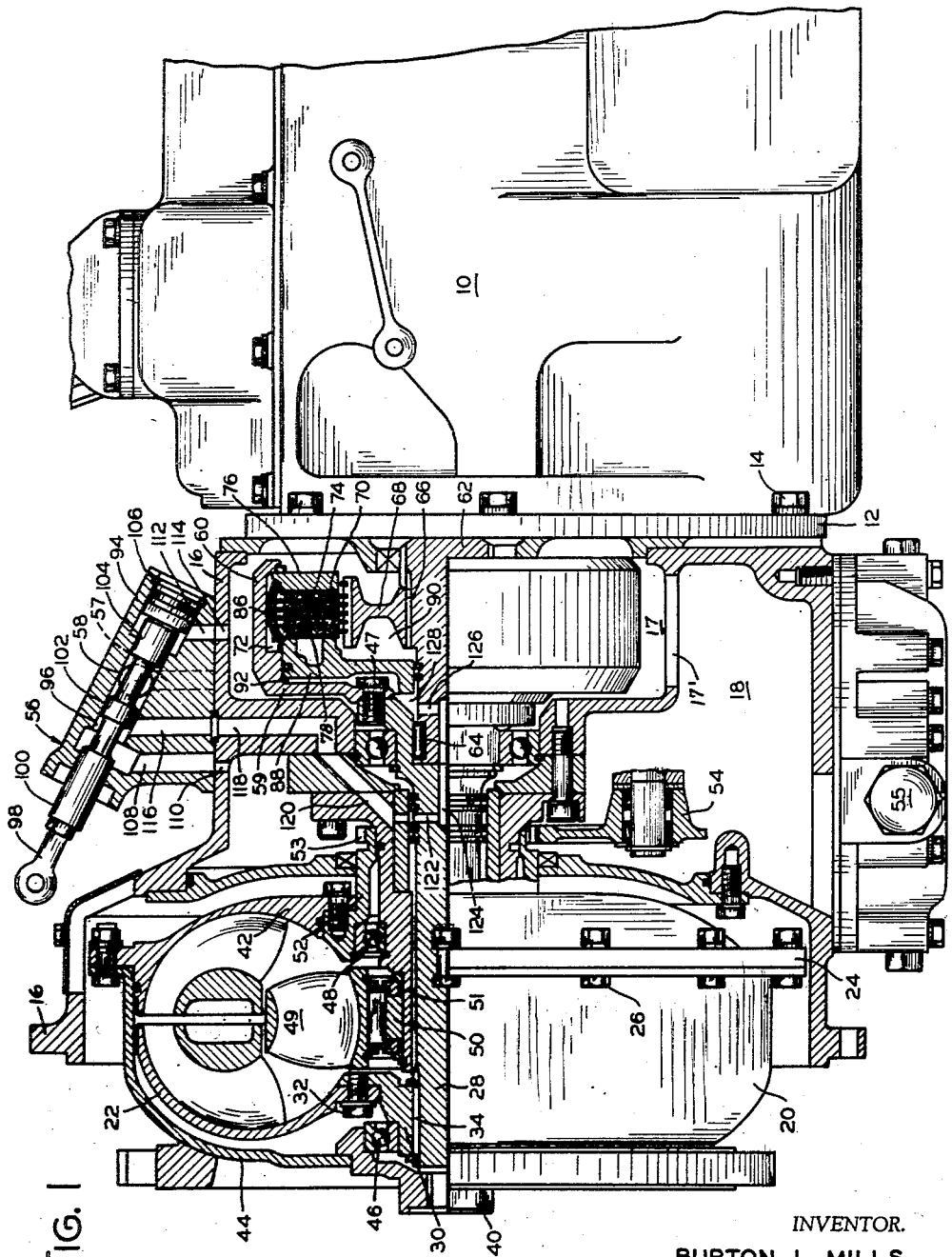
Figure 1 illustrates a side view of my invention (as applied to a clutch) in partial section combined with transmission and torque converter means.

Referring now in detail to the drawings, a change-speed transmission of known type is illustrated generally at numeral 10, the input side of which is connected at a flange 12 by a ring of bolts 14 to a housing 16 of a disconnect clutch mechanism and control means therefor, the clutch mechanism being mounted in chamber 17 of the housing which communicates with sump chamber 18 through an opening 17'. The housing 16 is connected to a housing 20 of an hydraulic torque converter 22 at flange 24 by a ring of bolts 26. The torque converter is of a well-known type being drivably connected to an output shaft 28 by means of an inner hub 30 which is connected by a ring of bolts, one of which is indicated at numeral 32, to the turbine element of the converter and which is in mesh with a splined end section of the shaft 28 at numeral 34. An input shaft 40 is adapted to be connected to the drive shaft of a prime mover, such as an internal combustion engine, and it with the pump section 42 of the converter and an interconnecting housing 44 is mounted to rotate in ball bearings 46 and 48 which are mounted between the output and input sections of the converter. A reaction member 49 is connected by sprags 50 to a support member 51, in known manner.

The input or pump section 42 of the converter extends inwardly of the housing 16 in a sleeve section 52 which terminates in an annular toothed portion 53 for driving a partially-shown gear member 54. The gear member 54 drives a fluid pressurizing supply pump, not shown, which is connected to the outside of housing 16 and which is adapted to supply regulated pressure fluid to the pump section 42 through hydraulic circuitry, not shown, and to a pressure regulator valve section 55 which communicates with a clutch control valve means 56 by way of an externally located conduit 57 and an opening 58 in the body of control valve 56.

The output shaft 28 of the converter terminates inwardly of the housing 16 in a flanged portion which is connected by a ring of bolts 47 to a radially extending disk 59 of an outer clutch hub 60, the clutch hub 60 being thereby caused to rotate with shaft 28.

A transmission input shaft 62 is mounted to extend partially inwardly of shaft 28 at the one end thereof and is rotatably supported thereon by circumferentially spaced needle bearings, one of which is shown at 64. An enlarged section of shaft 62 is splined at 66 for engagement with an inner clutch hub 68 which is splined about the outer periphery thereof for engagement with a plurality of splined clutch disks 70 in well-known manner so that the clutch disks are movable axially along the splines of the inner clutch hub.

The outer clutch hub 60 is splined about the inner periphery thereof, one of which splined teeth is shown at numeral 72, for driving engagement with a plurality of clutch disks 74 which are arranged alternately with respect to disks 70 and each of which is formed with teeth or splines about the outer periphery for engagement with the spline of the outer clutch hub.

Clutch plates 74 include end plates 76 and 78 which are also splined for engagement with the inner peripheral spline of the outer clutch hub. At least selected ones of the teeth 80 and 82 forming the splines of the peripheral sections of the end plates are tapered outwardly in diverging directions for abutment with opposite ends of a plurality of circumferentially spaced clutch disengaging springs 86. The various springs 86 are, of course, mounted for rotation with disks 74 of the outer clutch hub and extend between the end plates 76 and 78 across non-splined circumferentially spaced sections of the disks 74, which are located intermediate said end plates as best seen in Figure 2. The axial and circumferential outward tapering of some or all of the teeth of the splined end plates in the aforesaid manner causes each of the springs 86 to be arched outwardly towards clutch hub 60 to provide adequate clearance between the springs and the adjacent peripheral portions of the clutch disks 74.

As pointed out hereinbefore, this clearance is extremely important in assuring proper separation of the clutch plates when the clutch is disengaged and in providing against possible entanglement or contact between the clutch disks 74 and one or more of the various springs 86. As discussed generally above, such entanglement or clutch "lock-up" is likely to occur in clutches of this type wherein the springs extend in a straight line between the end plates, and will be most likely to occur in applications requiring numerous reversals in direction of a vehicle or stopping and starting thereof. This invention provides a construction which eliminates the possibility of such a lock-up. It has been found in practice that a taper on the splined section of each end plate of about 7½° from the vertical is adequate to provide for sufficient arching of the springs. The optimum taper angle may, of course, vary depending upon other details of clutch construction. Clutch disks 70 and 74 are caused to be engaged one with the other for transmitting power from outer clutch hub 60 to transmission input shaft 62 by means of a donut-shaped hydraulically actuated piston member 88 which is mounted on shaft member 62 for rotation with the outer clutch hub. The clutch disks are engaged one with the other whenever hydraulic fluid under pressure is introduced into a chamber 92 formed between piston member 88 and disk 59.

Control valve means 56 is utilized to control the operation of the clutch. The control valve comprises a housing 94 having a bore 96 therethrough of variable diameter in which is mounted a spool valve 98 having lands 100, 102 and 104 formed thereon. Sealing means 106 is provided at one end thereof for preventing the escape of fluid from the valve housing. In addition to the conduit 57 which supplies pressure fluid through opening 58 into the chamber formed between lands 102 and 104, a passage 108 connects the one end of the valve bore to chamber 18 of the clutch housing through an opening 110, and a passage 112 similarly connects the other end of the valve bore to chamber 18 through an opening 114. A passage 116 is connected at its upper end to the left end of the small diameter portion of the valve bore and communicates with piston chamber 92 through passages 118, 120, 122, 124, 126 and 128, the said passages being formed in internal portions of the housing as well as through shaft members 28 and 62.

With the spool valve 98 in the position illustrated in Figure 1, wherein valve land 102 is located intermediate opening 58 and passage 116, it will be apparent that pressure fluid cannot enter chamber 92 and that springs 86 will maintain the clutch disengaged. Any fluid which leaks past valve lands 102 and 104 is vented to chamber 18 at sump pressure through passages 108 and 112, respectively.

If the spool valve is now actuated leftwardly, communication is established between the valve chamber intermediate lands 102 and 104 and passage 116, thereby effecting the application of pressure fluid to piston 88 through the aforementioned passages. When it is again desired to disengage the clutch the control valve is returned to the illustrated position for cutting off communication between the pressure fluid in conduit 57 and conduit 116, conduit 116 and the circuitry connecting the same to piston chamber 92 being then vented through passage 108 and opening 110 to low pressure chamber 18.

According to the above specific disclosure of one embodiment of my invention it will now be apparent that I have provided an hydraulic disconnect clutch mechanism for use with change-speed transmissions which is constructed to utilize arched disengaging springs located in spaced circumferential relation about the multiple disks of the clutch in order to assure proper separation of the clutch plates and to afford adequate clearance between the disks and the springs, thereby avoiding the possibility, for example, of a spring lock-up when clutch disengagement is demanded by an operator. By means of this relatively simple, low-cost and compact arrangement there is provided a substantially improved construction in friction devices of the type contemplated.

The embodiment of my invention described herein is for illustrative purposes only, it being apparent to persons skilled in the art that said construction may be applicable to various other friction devices, such as brakes, wherein springs are utilized for disengaging the friction elements. Therefore, although only one embodiment of the invention has been shown and described herein, it is to be expected that modifications thereof may be made without departing from the scope of the invention.

I claim:

1. A friction device comprising a rotatable inner hub, a rotatable outer hub located radially outwardly from the inner hub, a plurality of first annular members drivably associated with the inner hub, a plurality of second annular members drivably associated with the outer hub and arranged alternately between said first annular members, said second annular members having end plates terminating at the peripheral portions thereof in axially and circumferentially outwardly tapered portions, means for frictionally engaging said first and second annular members whereby to drivably connect said inner and outer hub members, and resilient means extending between said outwardly tapered portions for urging said second annular members out of engagement with said first annular members, said resilient means being caused to arch outwardly of the peripheral portions of said second annular members by said outwardly tapered portions.

2. A friction device comprising a driving shaft, a driven shaft, an outer clutch hub secured to the driving shaft, an inner clutch hub secured to the driven shaft, a plurality of axially spaced disk members connected to the outer clutch hub for axial movement relative thereto and for rotation therewith, a plurality of disk members also connected to said inner clutch hub for axial movement relative thereto and for rotatably driving said inner clutch hub, said first and second mentioned disks being alternately arranged for frictional engagement therebetween, piston means adapted to compress said first and second mentioned disks for transmitting the rotation of the driving shaft to the driven shaft through said alternately arranged disks, said first mentioned disks including opposite end plates having axially and circumferentially outwardly tapering portions located adjacent the outer peripheries thereof, and spring means mounted between said outwardly tapering portions for disengaging said first and second mentioned disks, said spring means being caused to arch radially outwardly of the outer peripheries of said first and second disks by engagement with the tapered portions of said end plates.

3. A friction device comprising a driving member, a driven member, said driving member being located radially outwardly of said driven member, first friction disk means extending radially between said driving and driven members and drivably connected to said driven member, second friction disk means extending radially between said driving and driven members and alternately arranged relatively to said first friction disk means for frictional engagement therewath, said second disk means being drivably connected to said driving means and including opposed end plates having splined outer peripheral portions which include facing surfaces which diverge axially and circumferentially outwardly from said disks, means for actuating said first and second disks axially of said driving and driven members for operatively connecting one to the other, and yielding means for disengaging said first disks from said second disks, said yielding means having opposite ends thereof in abutment with the diverging surfaces of said end plates whereby said yielding means is caused to arch outwardly of said disks for providing clearance between said disks and said yielding means.

References Cited in the file of this patent

UNITED STATES PATENTS 2,380,680     Thompson _____ July 31, 1945

FOREIGN PATENTS 905,019     France _____ Mar. 26, 1945